United States Patent [19]

Shams

[11] Patent Number: 5,761,382
[45] Date of Patent: Jun. 2, 1998

[54] MULTIPLE ELASTIC FEATURE NET AND METHOD FOR TARGET DEGHOSTING AND TRACKING

[75] Inventor: Soheil Shams, Redondo Beach, Calif.

[73] Assignee: Hughes Electronics Corporation, El Segundo, Calif.

[21] Appl. No.: 861,215

[22] Filed: May 21, 1997

Related U.S. Application Data

[62] Division of Ser. No. 311,373, Sep. 23, 1994, Pat. No. 5,680,514.

[51] Int. Cl.$^6$ .................................................. G06E 1/00
[52] U.S. Cl. ................................ 395/21; 395/22; 395/23
[58] Field of Search ............................ 395/20–25, 27; 382/155–161

[56] References Cited

FOREIGN PATENT DOCUMENTS

WO 89/08360  3/1989  WIPO.

OTHER PUBLICATIONS

Schwarzinger, M., et al. "Vision–Based Car–Following: Detection, tracking, and Identification", Intelligent Vehicles, 1992 Symposium Proceedings, pp. 24–29.

Hertz, J., et al. *Introduction to the Theory of Neural Computations*, Addison–Wesley, pp. 236–237.

Lendaris et al, "Hardware neural network implementation of tracking system," Neural networks for signal processing IV, pp. 451–460, Sep. 1994.

Chin, "Neural network approach in multiple target tracking." 1991 IEEE International Joint conference on Neural networks, pp. 1220–1223 vol. 2, Nov. 1991.

*Primary Examiner*—Tariq R. Hafiz
*Attorney, Agent, or Firm*—V. D. Duraiswamy; W. K. Denson-Low

[57] ABSTRACT

A multiple elastic feature network having N independent sets of M feature specific neurons that respond to the temporal properties of a number of targets. The targets are represented by sets of M feature specific coordinates. Each of the neurons and its coordinates are labeled with a different one of the feature types, and have an associated receptive field and distortion, locking and expectation parameters. A sequence of candidate coordinates, which include the targets' coordinates as well as false or ghost coordinates, is input to the MEFN. Each successive candidate coordinate selects the closest neuron that has the same feature type and whose receptive field includes the candidate coordinates. The coordinates of the selected neuron and the other neurons in its set are adjusted towards the candidate coordinates. The distortion, expectation and locking parameters measure the distortion in the neurons' coordinates, the elapsed time since each neuron was last selected and the changes in the neurons' coordinates, respectively. As the sets of neurons converge towards respective targets, the expectation, distortion and locking parameters are reduced, and hence the receptive fields are reduced, causing the neurons to lock onto and track the targets.

4 Claims, 5 Drawing Sheets

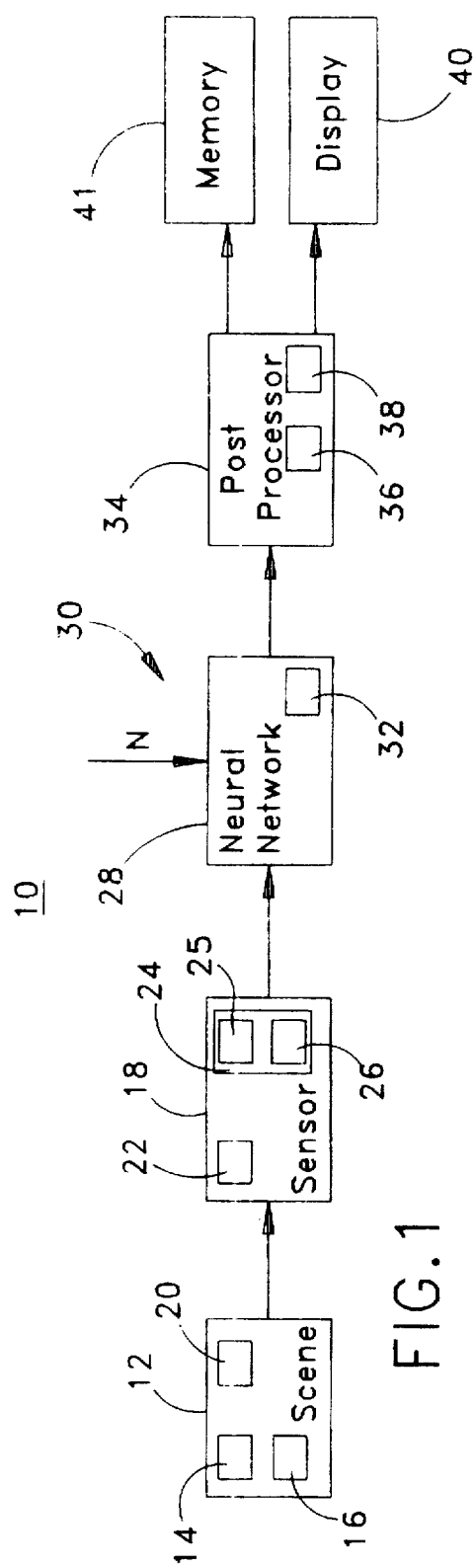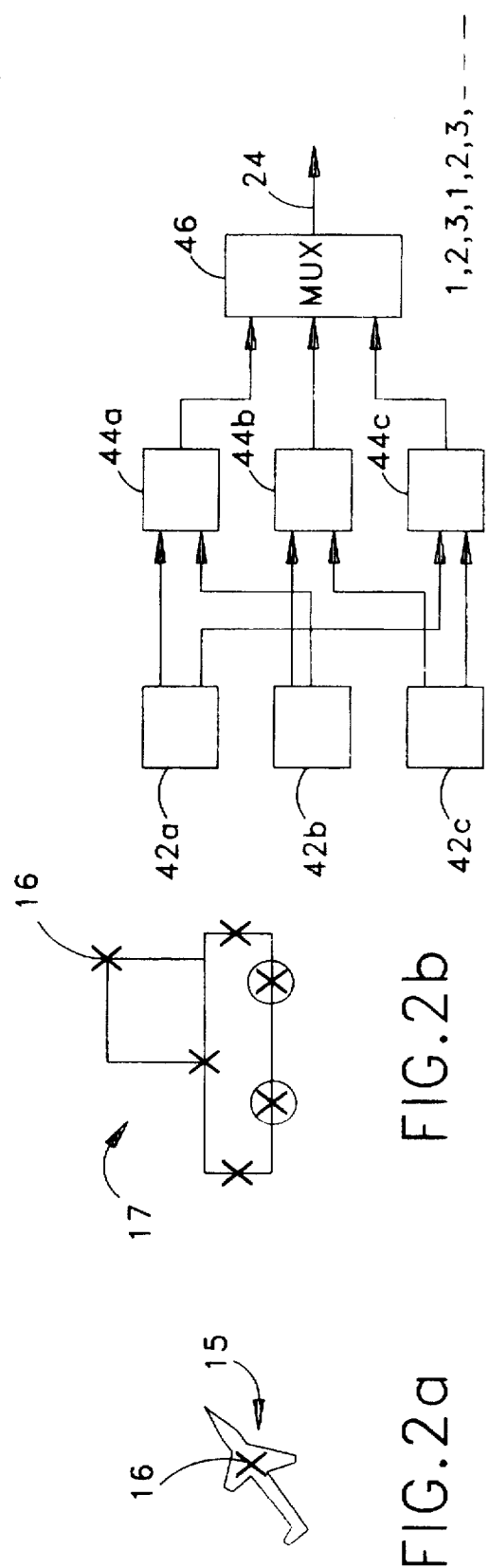

MULTIPLE ELASTIC FEATURE NET AND METHOD FOR TARGET DEGHOSTING AND TRACKING

This is a division of application Ser. No. 08/311,373 filed Sep. 23, 1994 now U.S. Pat. No. 5,680,514.

BACKGROUND OF THE INVENTION

1. Field of the Invention

The present invention generally relates to deghosting and tracking targets, and more specifically to a multiple elastic feature net (MEFN) and method for deghosting and tracking targets.

2. Description of the Related Art

Historically, electronic tracking systems were able to compute and track a target's coordinates by measuring its angle of approach and range. In some modern systems only the target's approach angle is available. For example, the range information for aircraft may be electronically jammed, rendering conventional tracking systems inoperable.

Ideally two sensors could be used to detect the target from angle-only data. The intersection of their respective angles would specify the target's coordinates. However, the detected angles are typically noisy, reducing the precision and reliability of the coordinates. Furthermore, when there is more than one target the sensors will produce false or "ghost" coordinates. For example, if at a given time the first sensor detects a target and the second sensor detects another target, the intersection of their angles will identify a ghost target, i.e. one that doesn't exist. The number of ghost coordinates and the complexity of the tracking problem is an exponential function of the number of targets.

A practical angle-only tracking system should be able to differentiate the "real" targets from the ghost targets, provide accurate coordinates and reliably lock onto the moving targets. The complexity of the system must be low enough to handle a large number of targets and respond accurately in real-time.

U.S. Pat. No. 4,621,267 to Wiley, "Bearing Intersection Deghosting by Altitude Comparison System and Methods", discloses a two antenna X-beam system for locating N targets. Each antenna receives signals reflected directly off of a target and signals reflected off of the target via an intermediate remote surface. Each antenna receives the signals on two different planes such that the signal detected at one plane has a time delay with respect to the signal detected at the other plane. By knowing the two time delays for each antenna, the altitude of each target as seen from each of the antenna systems can be calculated. The bearing angles are determined for each target at each antenna, and the actual N target locations of the $N^2$ possible locations are determined by locating the intersection of lines defined by the bearing angles for which the associated altitudes for both antennas are equal.

This system is a computationally complex system. Its complexity increases as the square of the number of targets, and hence it has a limited capacity for providing timely targeting information. This system, like most others, approaches the dynamic tracking problem as a sequence of static problems. Each target is detected and its coordinates are computed without the benefit of prior tracking information.

The static approach is typically used because the methods are too complicated to efficiently track and update the targeting information in real time. In these systems, the time between iterations is too great to maintain a significant correlation between the targets' positions. Hence the systems are not designed to utilize the dynamic characteristics associated with the tracking problem. These types of systems typically have a low target capacity (less than 20), relatively high error rates, i.e., identify ghost targets, and are brittle. Missing, incomplete or noisy data, which are common problems in all practical systems, can cause these systems to fail.

Neural network architectures have been used to solve a variety of optimization problems. Tuevo Kohonen, "Self-Organization & Associative Memory," Springer-Verlag, 3rd edition 1989 pp. 127–133 discloses a Self-Organizing Feature Map (SOFM) that uses a single layer and set of neurons. The neurons form a topographic map of the input signals, in which the most important similarity relationships among the input signals are converted into spatial relationships among the responding neurons. The SOFM is trained for a specific application by randomizing the coordinates of the neurons and setting their receptive fields to cover the entire input space. The receptive field defines the radius around the neuron to which it will respond to an input signal. The neurons respond to each input signal that falls within their receptive fields by moving towards the input signal. The final spatial distribution of the neurons mirrors the distribution of the input signals. If Kohonen's network was applied to the deghosting and target tracking problem, the neuron's would reflect the spatial distribution of the candidate coordinates. They would not converge and track the real targets.

SUMMARY OF THE INVENTION

The present invention seeks to provide a robust, low complexity, high capacity neural network and method for real-time deghosting and tracking of targets.

This is accomplished with a multiple elastic feature network (MEFN) having N independent sets of M feature specific neurons that respond to the temporal properties of the targets. Each of the neurons and its coordinates are labeled with a different one of the feature types, and have an associated receptive field and distortion, locking and expectation parameters. Each of the targets is represented by a set of M coordinates, which are labeled with a different one of the feature types. A sequence of candidate coordinates, which includes the targets' coordinates as well as false or ghost coordinates, is input to the MEFN.

Each successive candidate coordinate selects the closest neuron that has the same label and whose receptive field includes the candidate coordinates. The coordinates of the selected neuron and the other neurons in its set are adjusted towards the candidate coordinates. The distortion, expectation and locking parameters measure the distortion in the neurons' coordinates, the elapsed time since each neuron was last selected and the changes in the neurons' coordinates, respectively. Each neuron's receptive field size is directly proportional to the expectation, distortion and locking parameters. As the sets of neurons converge towards respective targets, the expectation, distortion and locking parameters are reduced, and hence the receptive fields are reduced, causing the neurons to lock onto and track the targets.

For a better understanding of the invention, and to show how the same may be carried into effect, reference will now be made, by way of example, to the accompanying drawings.

BRIEF DESCRIPTION OF THE DRAWINGS

FIG. 1 is a block diagram of a target deghosting and tracking system in accordance with the present invention;

FIGS. 2a and 2b are diagrams of the point and area type objects;

FIG. 3 is a block diagram that illustrates the generation of input coordinates using angle-only data;

DETAILED DESCRIPTION OF THE INVENTION

Figure 4:
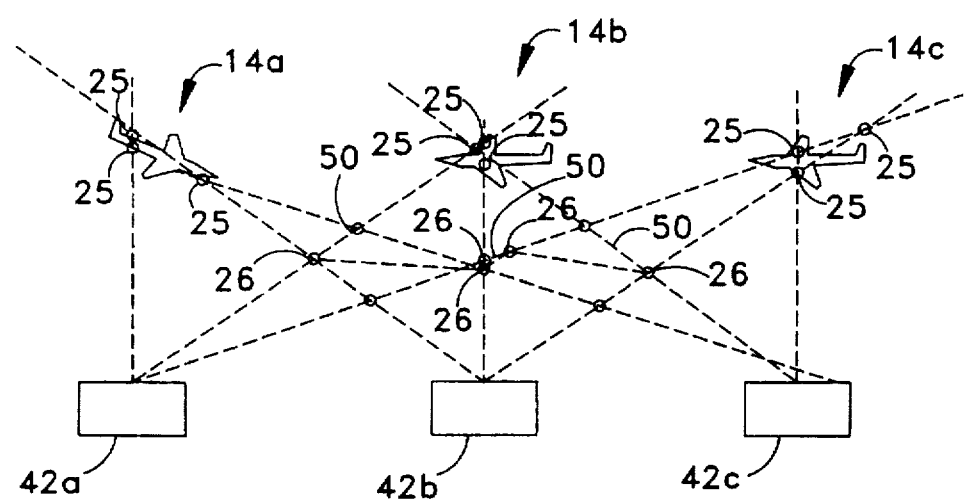
FIG. 4 is a diagram of a targeting scene for the three sensor multiple target system shown in FIG. 3.

FIG. 1 is a block diagram of a target deghosting and tracking system 10. A scene 12 such as a radar, visible or acoustical image, contains a plurality of stationary or moving targets 14 such as airplanes. The time varying scenes can be analyzed as a sequence of independent still frames or as a single time varying signal. The temporal properties of the time varying signal can be used to track the targets. The targets can be classified either as point or area objects. As shown in FIG. 2a the point objects 15 are characterized by the coordinates 16 of their centroids. As shown in FIG. 2b the area objects 17 have a specific size and shape and are described by sets of labeled coordinates 16, which correspond to specific points on a scaled template of the object. In general the coordinate space can be two, three or four-dimensional, in which a time index provides the fourth dimension.

In FIG. 1 a sensor 18 extracts features 20 from the scene 12, assigns labels 22 to the features and computes their associated candidate coordinates 24. Examples of typical features are bearing information from a radar system or edge orientations, texture, color or frequency information from a visible image. The different feature classes and subclasses are each assigned a different label, typically a number.

The labeled coordinates 24 include M labeled "real" coordinates 25 for each target, as well as false or "ghost" coordinates 26. For point objects, the M real coordinates 25 are each an estimate of the target's centroid 16. For area objects, the M coordinates are estimates of respective coordinates 16 on the target. The ghost coordinates are a result of the inherent geometry problem, and the noisy feature extraction and labeling processes. In some cases, such as tracking airplanes from angle-only data, the tracking problem can be ill-posed, in which case the number of candidate coordinates 24 is necessarily greater than the number of actual target coordinates 16.

The sensor sequentially outputs the candidate coordinates 24 with respective labels 22 to a neural network 28 for deghosting and tracking the targets 14. An estimate N 30 of the number of targets is also provided as an input to the network. The estimate N is provided from a separate source and can be based on typical values for a type of scene, visual information or intelligence reports. The neural network outputs sets of labeled coordinates 32, which correspond to the positions of possible targets. As the network converges towards the real coordinates 25, the neurons lock onto and track the real targets 14 and diverge away from the ghost targets. With time, the accuracy and confidence level of the coordinates 32 increases.

The labeled coordinates 32 are provided as inputs to a post-processor 34, which selects the higher confidence coordinates as real targets and discards the lower confidence ones as ghost targets. The post-processor can also use other information to filter out the ghost targets. For example, if the topography of the scene is known, the post-processor could disqualify coordinates that place vehicles in a lake or that position airplanes inside a mountain. Furthermore, higher level programming techniques could be used, for example, to analyze the path of the coordinates. A highly random path would be disqualified because it does not conform to the possible paths of the targets.

The post-processor assigns a symbol 36 to each of the selected sets of labeled coordinates 32. The symbols' coordinates 38 are set equal to the centroids of the respective coordinate sets. The symbols are displayed on a video display 40 and track the movement of the targets 14. Alternatively, or in addition to displaying the symbols, the post-processor may store the coordinates and tracking information in a memory 41 for subsequent analysis.

FIG. 3 is a block diagram that illustrates the generation of the labeled input coordinates 24 for point objects using angle-only data. This type of system is used to deghost and track aircraft. Three sensors 42a–42c e.g., radar units, continuously detect and output the approach angles or bearings for the targets. Three processing units 44a–44c receive mutually exclusive pairs of the angle data as inputs. Knowing the coordinates for each of the sensors, the processing units compute the coordinates 24 at which the pairs of angles intersect and assign them respective labels 22, i.e., 1, 2 or 3. A coordinate labeled with a 1 was produced by the first processing unit 44a and represents the intersection of the angles sensed by sensors 42a and 42b, and similarly for labels 2 and 3. A multiplexer 46 polls each of the processing units, 1,2,3,1,2,3, . . ., and periodically outputs the labeled coordinates 24 to the neural network 28.

FIG. 4 is a diagram of a possible targeting scene 12 for the three-sensor multiple target system shown in FIG. 3. Ideally, at any one time, the three sensors 42a–42c would detect the approach angles of the same target 14a, 14b or 14c, and hence the three labeled coordinates 24 found by intersecting the angles would each be an estimate 25 of that target's position. Because the angles are some-what noisy, the estimates 25 form small triangles for each real target 14. The triangles' centroids provide reasonably accurate estimates of the targets', positions.

However, in typical systems, the sensors randomly detect the approach angles of the targets such that the labeled coordinates 24 are substantially random and include both the targets' estimated coordinates 25 and the ghost coordinates 26. The ghost coordinates are a result of intersecting angles that correspond to different targets. Ghost targets 50 are defined by sets of M ghost coordinates 26, each coordinate having a different one of the feature levels 22. The ghost targets are represented by triangles which tend to be larger than those associated with the real targets, and will break up and reform at different places in the scene as the real targets move around.

The number of potential labeled coordinates is on the order of $MN^2$, with only MN of them being the estimated target coordinates 25. Therefore, as the number of targets increases, the complexity of suppressing the ghost coordinates i.e., deghosting, and tracking the targets increases exponentially. The neural network architecture 28 and tracking method embodied in the present invention provide a low complexity and relatively accurate approach for tracking targets.

Figure 5:
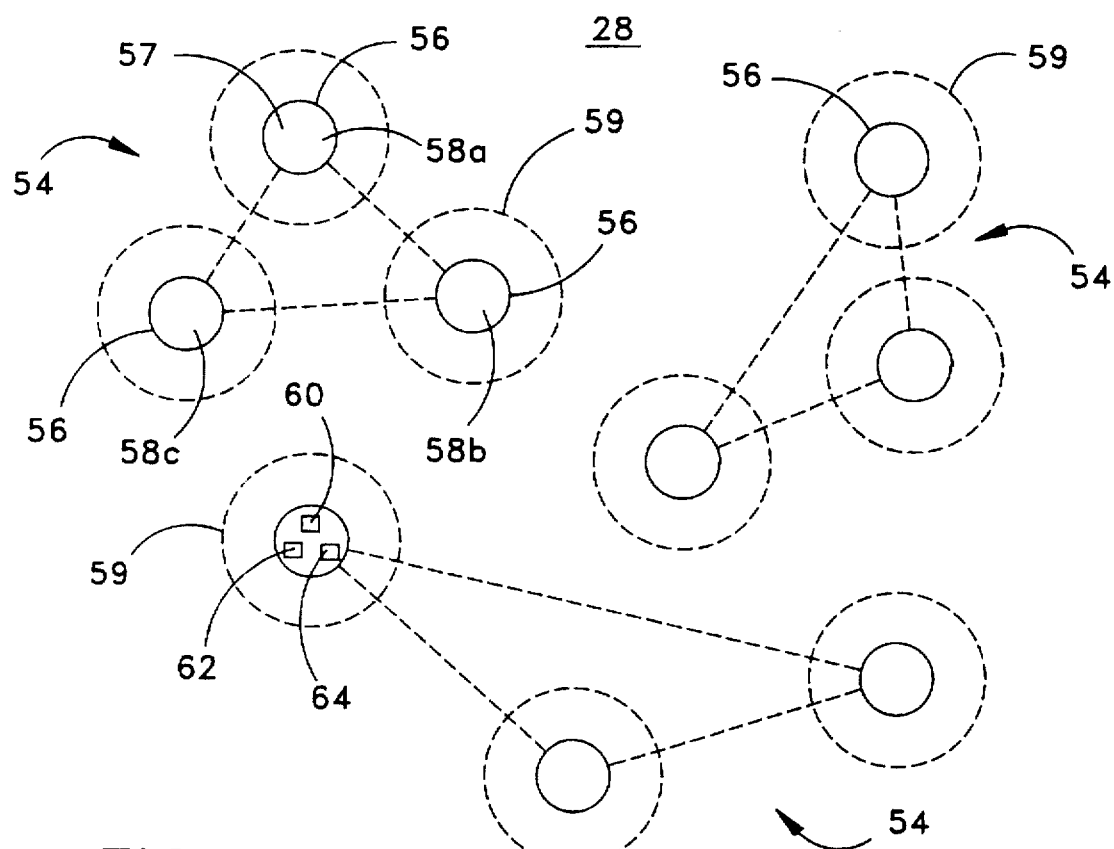
FIG. 5 is a diagram of the MEFN used in the present invention to deghost and track the targets.

FIG. 5 is a diagram of the MEFN 28 used in the present invention to deghost and track the targets 14. The MEFN uses N independent sets 54 of neurons. Each set includes M feature specific neurons 56 with coordinates 57. The neurons each have different labels 58A–58M which are in one-to-one correspondence with the labeled estimated coordinates 25 for each target. For example, for the three-sensor angle-only tracking system shown in FIGS. 2 and 3, M=3 and each set 54 includes neurons labeled 1, 2 and 3.

Each neuron 56 has an associated adaptive receptive field $r_{ij}^t$ 59 that is a function of a distortion parameter $p_{ij}^t$ 60, a locking parameter $h_{ij}^t$ 62 and an expectation parameter $e_{ij}^t$ 64. The $i^{th}$ subscript identifies the neuron set the $j^{th}$ subscript identifies the neuron in the set and the t superscript is the time index.

The receptive field defines a radius around the neuron in which it may respond to an input. When the network is initiated all of the receptive fields are large. As the neurons converge, the receptive field is reduced so that the neurons are only sensitive to the local movements of a particular target coordinate. If the neuron converges to a ghost coordinate, its receptive field will increase until it breaks away.

The locking parameter 62 is proportional to the previous changes in the neuron's coordinates. As the neuron converges towards a target's coordinate, its locking parameter is reduced, which in turn reduces it receptive field. Conversely, if the neuron's coordinates change substantially, its locking parameter will increase. The locking parameter provides memory based upon the neuron's prior movement, and hence tends to change much slower than the neuron's receptive field.

The expectation parameter 64 is proportional to the elapsed time (number of iterations) since the neuron was last changed by a candidate coordinate 24. On average each neuron should be selected one out of every $MN^2$ iterations. If the neuron is not selected, it may have converged toward a ghost coordinate that no longer exists, or its receptive field may be too small. In either case, the parameter and the receptive field are increased until the neuron is selected, at which point its expectation parameter is reset to its initial value.

The distortion parameter 60 is a function of the neurons' coordinates 57. For point objects, the distortion decreases as the coordinates converge towards one of the target's centroids. The perimeter of the geometric shape formed by the set of neurons is a global distortion parameter, i.e., one that is the same for each neuron in the set. The sum of the distances between a neuron and each of the other neurons in the set is a local parameter, i.e., one that is specific to each neuron. For area objects, the distortion decreases as the size and shape of the set of neurons conforms to the scaled template.

The estimated coordinates 25 associated with the real targets tend to form smaller shapes (triangles) than do the ghost coordinates 26 and are more consistent over time. At a given instant, a set of ghost coordinates may form a relatively small shape, causing the neurons to converge towards the associated ghost target. However, the movement of the targets in the scene causes the ghost object to grow quickly and break up. Therefore, the sets of neurons will tend to converge towards the smaller and more consistent shapes generated by the estimated coordinates 25 and diverge away from the ghost targets. The neurons' receptive fields are reduced as the associated distortion parameter decreases.

Figure 6:
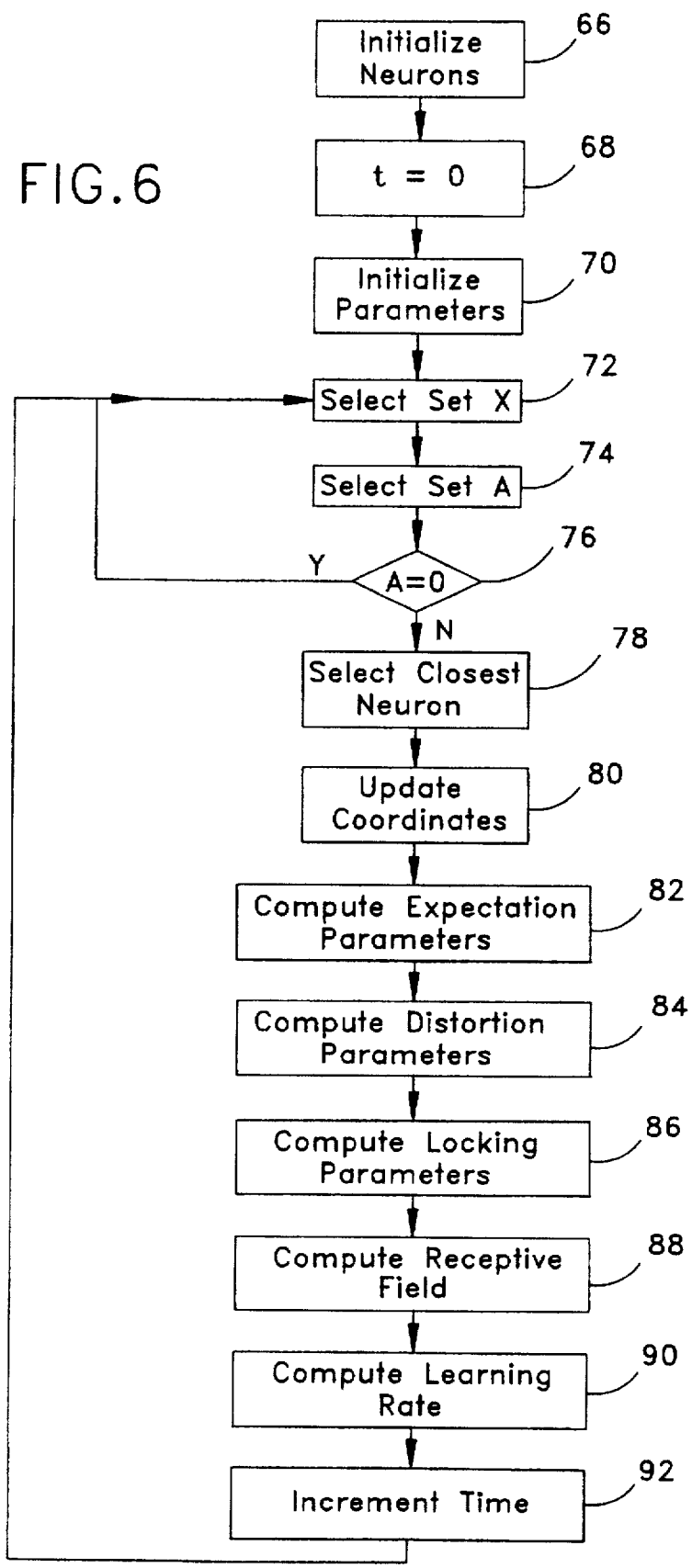
FIG. 6 is a flowchart for the MEFN shown in FIG. 5.

FIG. 6 is a flowchart illustrating the MEFN 28 for deghosting and tracking the targets 14. In addition to the receptive field $r_{ij}^t$, and locking $h_{ij}^t$, expectation $e_{ij}^t$ and distortion $p_{ij}^t$ parameters, the MEFN uses a number of other parameters which are defined as follows:

x=Vector of the input coordinates 24.

$m_{ij}^t$=Vector of the neurons' coordinates 57.

$F_{ij}$=Feature type associated with neuron ij 58.

F(x)=Feature type of input point x.

$k_{ij}^t$=Counter for $e_{ij}^t$.

$l_{ij}^t$=Counter for $h_{ij}^t$.

$h'^t_{ij}$=Low gain locking parameter, $h'^t_{ij}<h_{ij}^t$.

α=Learning rate of selected neuron.

α'=Learning rate of other neurons in selected set.

elast=The elasticity parameter of the network.

S(z)=A bounded and monotonically increasing function for $e_{ij}^t$ and $h_{ij}^t$, e.g., the Sigmoid activation function $$\frac{1}{1+\exp(-z)}.$$

$\lambda_h, \lambda_e$=Maximum values for $h_{ij}^t$, and $e_{ij}^t$, respectively.

$g_h, g_{h'}, g_e$=Sigmoid gain parameters for $h_{ij}^t$, $h''_{ij}$ and $e_{ij}^t$, respectively, with $g_{h'}<g_h$.

$\tau, \lambda_1, \lambda_2$=Annealing decay, start and end values for the receptive field.

$\tau_h$=Decay term for selected $h_{ij}^t$.

$\delta_e$=Increment size for all $e_{ij}^t$.

ε=Minimum receptive field size.

The ranges and typical values for the fixed parameters for the three-sensor angle-only tracking system are as follows:

0<α<1 with a typical value of 0.9, elast=[1,50] with a typical value of 35, $k_0$=–40, $l_0$=+40, $\lambda_h$=[1.0,50], with a typical value of 2, $\lambda_e$=[10,100], with a typical value of 50, $g_h$=[0.05,0.5], with a typical value of 0.2, $g_{h'}<g_h$=[0.01,0.45], with a typical value of 0.02, $g_e$=[0.05,0.5], with a typical value of 0.2, $\tau_h$=[1,30], with a typical value of 12, $\delta_e$=[0.01,2], with a typical value of 0.02, $\lambda_1$=[1,10], with a typical value of 2, $^1\lambda_2$=[0.2,5], with a typical value of 0.75, and τ is selected such that the receptive fields annealing term is halfway between $\lambda_1$ and $\lambda_2$ at 200<t<1000 iterations.

As shown in FIG. 6, the coordinates $m_{ij}^t$ for each set of neurons 56 are randomly initialized with values inside a specified region of interest (step 66), and the time parameter is set equal to zero (step 68). In step 70, the parameters are initialized as follows:

The distortion parameter for point objects can be either its perimeter, $$p_{ij}^t = \sum_{j=2}^{M} \|m_{ij}^t - m_{ij-1}^t\| \text{ for } 1 \leq i \leq N, \quad (1)$$

or a local distortion of each neuron $$p_{ij}^t = \sum_{l=1}^{M} \frac{\|m_{ij}^t - m_{il}^t\|}{M-1} \text{ for } 1 \leq i \leq N, 1 \leq j \leq M. \tag{2}$$

The distortion parameter for area objects is given by:

$$p_{ij}^t = \sum_{l=1}^{M_i} \frac{\|(m_{ij}^t - m_{il}^t) - \gamma_{ij}\delta_{ijl}\|}{M_i - 1} \text{ for } 1 \leq i \leq N, 1 \leq j \leq M_i \tag{3}$$

where $\delta_{ijl}$ defines the template of the object's shape, $\gamma_{ij}$ is the scaling parameter, i selects the object, j and l select points on the object and $M_i$ is the number of points on the selected object.

$$k_{ij}^0 = k_{0, i, j}$$

$$l_{ij}^0 = l_{0, i, j}$$

$$h_{ij}^0 = \lambda_h S(g_h l_0), _{i, j} \tag{4}$$

$$h_{ij}^{'0} = \lambda_h S(g_h l_0), _{i, j} \tag{5}$$

$$e_{ij}^t = \lambda_e S(g_e k_0), _{i, j} \tag{6}$$

$$r_{ij}^t = (\lambda_1 + \lambda_2) p_{ij}^0 h_{ij}^0 + e_{ij}^0 + \epsilon, _{i, j} \tag{7}$$

$$\alpha'_{ij} = \left( \frac{\alpha p_{ij}^0}{p_{ij}^0 + elast} \right)_{i, j} \tag{8}$$

The deghosting and tracking process is initiated in step 72 by selecting the first candidate coordinate x25 with label F(x). In the next step 74, each of the neurons 56 having the same label 58 as the candidate coordinate and having receptive fields that are large enough to include x, are included in a set A. Formally, $$A = \{m_{ij}^{t-1} \|m_{ij}^{t-1} - \bar{x}\| \leq r_{ij}^{t-1} \wedge F_{ij} = F(x)\}. \tag{9}$$

If set A is empty (step 76), control returns to step 72 and the next candidate coordinate is selected. Otherwise, the algorithm selects the neuron in set A that is closest to x (step 78). The selected neuron is designated by (st) with coordinates $m_{st}^t$. In step 80, the selected neuron's coordinates and the other coordinates in its set are moved towards x:

$$m_{sj}^t = m_{sj}^{t-1} + \frac{dm_{sj}^{t-1}}{dt} \forall j, \tag{10}$$

where $$\frac{dm_{sj}^{t-1}}{dt} = c(x - m_{sj}^{t-1}) \forall j. \tag{11}$$

The scale factor c is equal to $\alpha$ for the selected neuron (st) and is equal to $\alpha'$ for the other neurons in its set.

The expectation parameters are updated in step 82 as follows:

$$k_{ij}^t = k_{ij}^{t-1} + \delta_e \forall (i \neq s \wedge j \neq t), \text{ and } k_{st}^t = k_0, \text{ so that}$$

$$e_{ij}^t = \lambda_e S(g_e k_{ij}^t) \forall i, \forall j. \tag{12}$$

The expectation parameter is bounded but increases at every iteration unless its neuron is selected. Once a neuron is locked onto a target coordinate, if the signal (coordinate) disappears the expectation parameter will increase, causing the receptive field to increase, and the neuron will move towards another target.

The distortion parameters $p_{sj}^t \forall j$ are recomputed in accordance with the selected equation, 1, 2 or 3 (step 84). The distortion parameters are reduced as the sets of neurons converge towards the targets, and are increased if the neurons mistakenly move towards one of the ghost targets.

The locking parameters are updated in step 86 as follows:

$$t_{sj}^t = t_{sj}^{t-1} - \frac{\tau_h h_{sj}^{t-1}}{\lambda_h} + \frac{dm_{sj}^{t-1}}{dt} \left( 1 - \frac{h_{sj}^{t-1}}{\lambda_h} \right) \forall j, \tag{13}$$

$$h_{sj}^t = \lambda_h S(g_h l_{sj}^t) \forall j \tag{14}$$

and $$h_{sj}^{'t} = \lambda_h S(g_h l_{sj}^t) \forall j. \tag{15}$$

The locking parameter increases when the change in the neuron's coordinates exceeds the threshold and is reduced otherwise. By making the locking parameter counter a function of h', the counter is bounded and the locking parameter has a "hysterisis" effect or memory, which improves the algorithms convergence and tracking.

In step 88, the neurons' receptive fields are updated according to:

$$r_{ij}^t = [\lambda_1 \exp(-t/\tau) + \lambda_2] p_{ij}^t h_{ij}^t + e_{ij}^t + \epsilon \forall i, \forall j. \tag{16}$$

The receptive field is proportional to the product of the distortion and locking parameters weighted by a decaying exponential of time, plus the expectation parameter and minimum radius $\epsilon$. The minimum radius ensures that the neurons can track moving targets. Reducing the receptive fields as a function of time reinforces the neural net's convergence and tracking properties.

As a set of neurons converges towards one of the target's, the distortion, locking and expectation parameters are reduced and maintain relatively low values. Hence, the neurons' receptive fields become relatively small and only respond to and track movements of the target. The receptive fields will increase, causing the neurons to move towards other targets if the distortion, expectation or locking parameters increase.

In step 90, $$\alpha'_{ij} = \frac{p_{ij}^t}{p_{ij}^t + elast}. \tag{17}$$

As the neurons converge, the distortion parameter decreases so that $\alpha'_{ij}$ is reduced, and the set of neurons conforms to the shape of the target's coordinates. The neurons' coordinates 32 and associated parameters are output to the post-processor 34.

In step 92, the time is incremented and the next labeled candidate coordinate x 24 is selected in step 72. The coordinates are read in from the multiplexer until the neural net is reset.

If the MEFN is applied to a static scene, the targets' coordinates are read in repeatedly until the network converges to the targets. The adaptive receptive field and the locking, distortion and expectation parameters ensure that the network will converge to the smallest distortion targets, e.g., triangles. Because the scene is static, the dynamic properties of the MEFN that eliminate the ghost targets are not applicable, and thus a few relatively small ghost targets may be identified as real targets.

Figure 7:
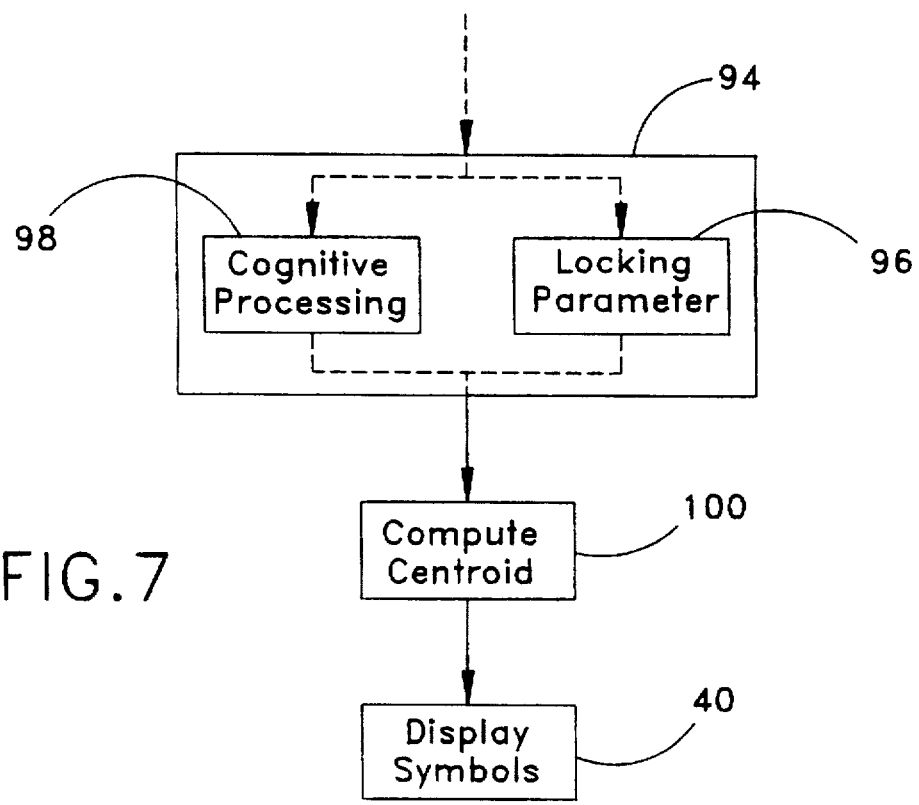
FIG. 7 is a flowchart for the post-processor and display shown in FIG. 1.

FIG. 7 is a flowchart of the post-processor 34. In step 94 the raw neuron data, i.e., coordinates 32 and the associated parameters, is filtered to identify the sets of neurons with the highest confidence levels (most likely to indicate real targets). Some of the sets of neurons might not be fully converged or may be temporarily stuck in a local minima (ghost targets). Furthermore the estimate N 30 may accidentally or intentionally overestimate the actual number of targets 14. Intentionally overestimating the number provides more neuron sets, thus increasing the probability that all of the targets will be detected. However, the additional neurons increase the complexity of the MEFN.

The sets of neurons can be filtered by (step 96) selecting the L<N sets that have the smallest locking parameters. The receptive fields or distortion parameters could also be used, but the locking parameter is a more accurate and stable measure. Alternatively, higher level or cognitive processing (step 98) can be performed on the data to remove sets that are not realistic for the tracking problem. For example, the processor might monitor the paths followed by the sets' centroids and suppress those that do not make sense, e.g. a plane flying in tight circles or through a mountain.

In step 100, the centroids 36 for the remaining sets are computed and a representative symbol 38 is assigned to each centroid. The pairs of symbols and centroids are provided as inputs to the memory 41 and/or the display 40. The displayed symbols are updated approximately every 20 iterations to detect and track the movement of the targets 14 in the scene 12.

Figure 8:
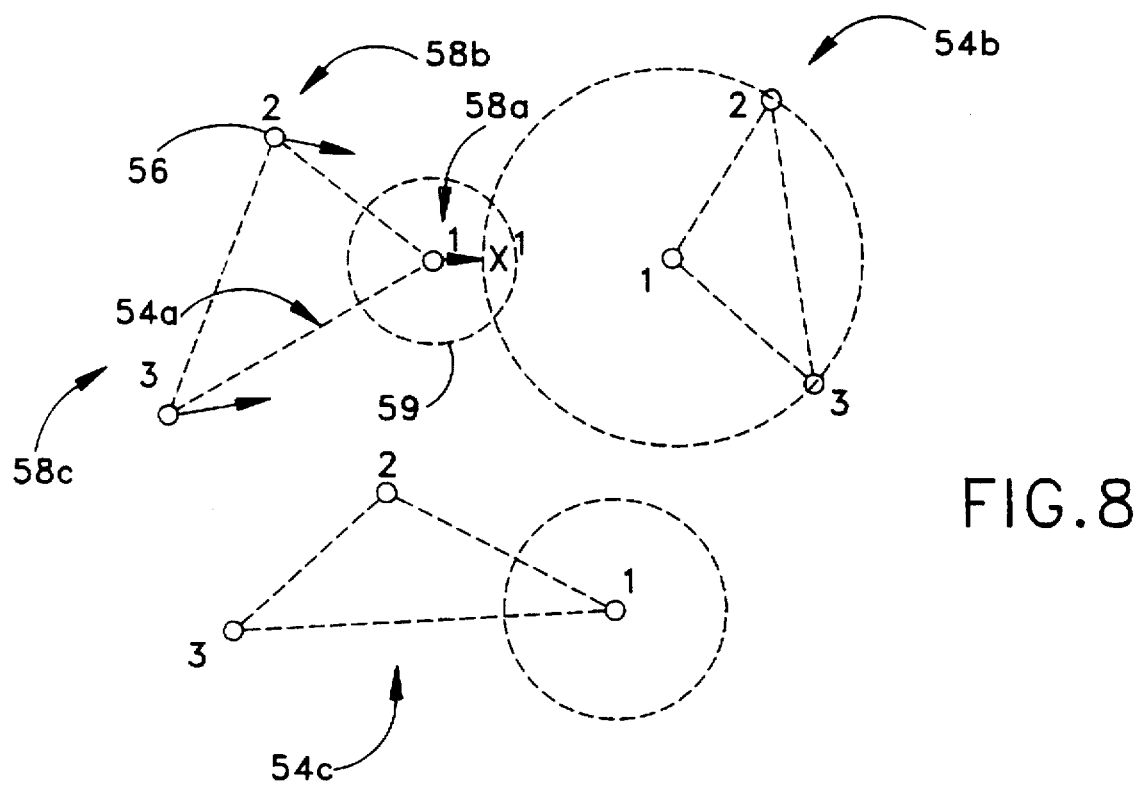
FIG. 8 is a diagram illustrating one iteration of the MEFN.

FIG. 8 is a diagram illustrating one iteration of the MEFN 28, in which three sets 54a–54c, each containing three neurons 56 that are labeled 1, 2 and 3 respectively, and a candidate coordinate x 24 which is labeled with feature type 1, are shown. The candidate coordinate is located within the receptive fields for the type 1 neurons from sets 54a and 54b, and is closer to the neuron in 54a. The coordinates of the neurons in set 54a move towards the candidate coordinates and their associated parameters are updated as described previously.

Figure 9A:
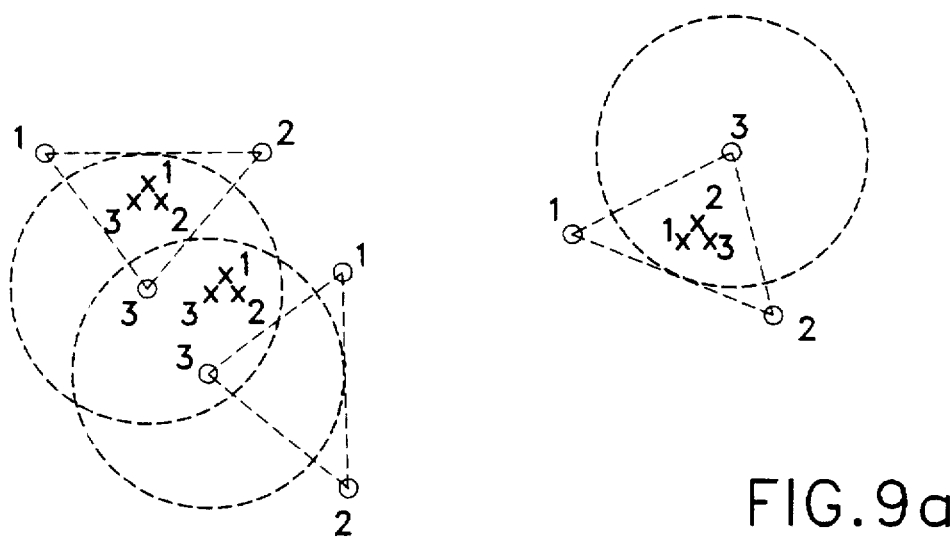
FIGS. 9a through 9c are diagrams that illustrate the MEFN's initial state, a partially converged state and the converged state.
Figure 9B:
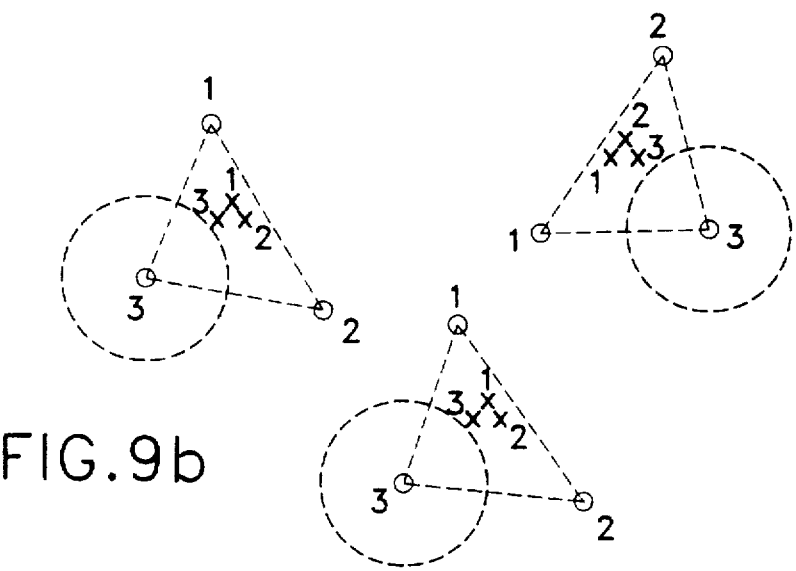
Figure 9C:
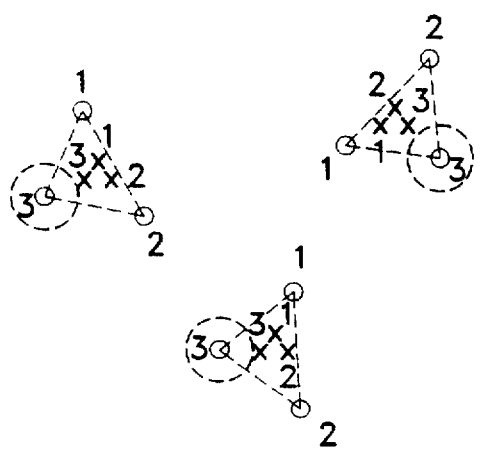

FIGS. 9a through 9c are diagrams that illustrate the MEFN's initial state, a partially converged state and the converged state. The ghost coordinates are not shown. Initially, the neurons are spaced far apart and have very large receptive fields so that they can respond to the targets' actual coordinates 25. As the MEFN converges, the neurons move towards the respective labeled coordinates and their receptive fields are reduced. When the neurons lock onto the respective coordinates, the receptive field collapses to approximately its minimum value so that the neurons will only respond to and track movements of that particular coordinate.

The multiple elastic feature network incorporates multiple independent sets of feature specific neurons to deghost and track targets. Each neuron includes an adaptive receptive field that is a function of distortion, expectation and locking parameters, which utilize the temporal characteristics of the targeting scene to lock onto and track the targets. The MEFN provides a robust and low complexity approach to the deghosting and tracking problem. It is capable of handling in excess of forty targets simultaneously, locks onto the targets within approximately 1000 iterations and has a relatively low error rate.

While several illustrative embodiments of the invention have been shown and described, numerous variations and alternate embodiment will occur to those skilled in the art. Such variations and alternate embodiments are contemplated, and can be made without departing from the spirit and scope of the invention as defined in the appended claims.

I claim:

1. A target deghosting and tracking system, wherein a plurality of targets are each represented by a set of M time varying coordinates which are each labeled with a feature type, comprising:

a sensor for sensing labeled candidate coordinates which are either one of the targets' M coordinates or labeled ghost coordinates;

a multiple elastic feature net having N sets of M feature specific neurons, each neuron and its coordinates being labeled with a different one of said feature types and having an adaptive receptive field and a distortion parameter, said neurons moving towards similarly labeled candidate coordinates that lie within their receptive fields to reduce said distortion parameters, thus causing said sets of neurons to converge towards and track respective targets and diverge away from said ghost coordinates; and a display for displaying respective target symbols that track the sets of neurons, and hence the targets.

2. The system of claim 1, wherein each neuron further comprises:

an expectation parameter that measures the time elapsed since the neuron was last moved, increasing said expectation parameter causes said neurons to diverge away from said ghost coordinates; and a locking parameter that is proportional to previous movements in the neuron's coordinates, decreasing said locking parameter causes said neuron to converge to said object coordinates.

3. A target deghosting and tracking system, wherein a plurality of targets are each represented by a set of M time varying coordinates which are each labeled with a feature type, comprising:

a sensor for sensing labeled candidate coordinates which are either one of the targets' M coordinates or labeled ghost coordinates;

a multiple elastic feature net having N sets of M feature specific neurons, each neuron and its coordinates being labeled with a different one of said feature types and having a distortion parameter and an adaptive receptive field, each neuron's adaptive receptive field being updated as a function of its distortion parameter and increasing as the elapsed time since the neuron was last selected increases, said neurons moving towards similarly labeled candidate coordinates that lie within their receptive fields to reduce said distortion parameters, thus causing said sets of neurons to converge towards and track respective targets and diverge away from said ghost coordinates; and a display for displaying respective target symbols that track the sets of neurons, and hence the targets.

4. A target deghosting and tracking system, wherein a plurality of targets are each represented by a set of M time varying coordinates that specify the target's predetermined size and shape, each coordinate in the set being labeled with a feature type, comprising:

a sensor for sensing labeled candidate coordinates which are either one of the targets' M coordinates or labeled ghost coordinates;

a multiple elastic feature net having N sets of M feature specific neurons, each neuron and its coordinates being labeled with a different one of said feature types and having a distortion parameter that is the deformation of the set of neurons with respect to a scaled template of the target's predetermined size and shape and an adaptive receptive field that is updated as a function of its distortion parameter, said neurons moving towards similarly labeled candidate coordinates that lie within their receptive fields to reduce said distortion parameters and the total deformation of said N sets of neurons, thus causing said sets of neurons to converge towards and track respective targets and diverge away from said ghost coordinates; and a display for displaying respective target symbols that track the sets of neurons, and hence the targets.

* * * * *